United States Patent
Gross et al.

(10) Patent No.: US 6,569,958 B1
(45) Date of Patent: May 27, 2003

(54) THERMOPLASTIC SILICONE ELASTOMERS FROM COMPATIBILIZED POLYESTER RESINS

(75) Inventors: Craig Steven Gross, Midland, MI (US); Michael Kang-Jen Lee, Midland, MI (US); Jun Liao, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 48 days.

(21) Appl. No.: 10/043,776

(22) Filed: Oct. 19, 2001

(51) Int. Cl.⁷ ............................................... C08G 77/08
(52) U.S. Cl. ...................... 525/446; 524/862; 524/751; 524/754; 525/904
(58) Field of Search ................................ 525/446, 903; 524/862, 751, 754

(56) References Cited

U.S. PATENT DOCUMENTS

| | | | |
|---|---|---|---|
| 4,500,688 A | 2/1985 | Arkles | 525/431 |
| 4,695,602 A | 9/1987 | Crosby et al. | 524/439 |
| 4,714,739 A | 12/1987 | Arkles | 525/92 |
| 4,831,071 A | 5/1989 | Ward et al. | 524/401 |
| 6,013,715 A | 1/2000 | Gornowicz et al. | 524/492 |
| 6,281,286 B1 | 8/2001 | Chorvath et al. | 524/862 |
| 6,362,287 B1 | 3/2002 | Chorvath et al. | 525/431 |
| 6,362,288 B1 * | 3/2002 | Brewer et al. | 525/431 |
| 6,417,293 B1 | 7/2002 | Chorvath et al. | 525/446 |
| 6,465,552 B1 * | 10/2002 | Chorvath et al. | 524/323 |
| 6,479,580 B1 | 11/2002 | Chorvath et al. | 524/588 |

FOREIGN PATENT DOCUMENTS

| | | | |
|---|---|---|---|
| EP | 0651009 A1 | 5/1995 | C08L/21/00 |
| WO | WO 96/01291 | 1/1996 | C08L/21/00 |

* cited by examiner

Primary Examiner—Margaret G. Moore
(74) Attorney, Agent, or Firm—Alan Zombeck

(57) ABSTRACT

A method of preparing a thermoplastic elastomer, and compositions thereof, are disclosed comprising:

(I) mixing
 (A) a thermoplastic resin comprising more than 50 percent by volume of a polyester resin having a softening point of 23° C. to 300° C.,
 (B) a silicone elastomer comprising a diorganopolysiloxane, where the weight ratio of said silicone elastomer to said thermoplastic resin is from 35:65 to 85:15,
 (C) a glycidyl ester compatibilizer,
 (D) an organohydrido silicon compound, and
 (E) a hydrosilation catalyst, components (D) and (E) being present in an amount sufficient to cure said diorganopolysiloxane; and
(II) dynamically vulcanizing said diorganopolysiloxane, wherein at least one property of the thermoplastic elastomer selected from tensile strength or elongation is at least 25% greater than the respective property for a corresponding simple blend wherein said diorganopolysiloxane is not cured and said thermoplastic elastomer has an elongation of at least 30%.

28 Claims, No Drawings

THERMOPLASTIC SILICONE ELASTOMERS FROM COMPATIBILIZED POLYESTER RESINS

FIELD OF THE INVENTION

The present invention relates to a thermoplastic elastomer composition wherein a silicone base is blended with a polyester resin and a glycidyl ester compatibilizer. The silicone gum contained in the base is then dynamically vulcanized during the mixing process to produce the thermoplastic elastomer composition.

BACKGROUND OF THE INVENTION

Thermoplastic elastomers (TPEs) are polymeric materials which possess both plastic and rubbery properties. They have elastomeric mechanical properties but, unlike conventional thermoset rubbers, they can be re-processed at elevated temperatures. This re-processability is a major advantage of TPEs over chemically crosslinked rubbers since it allows recycling of fabricated parts and results in a considerable reduction of scrap.

In general, two main types of thermoplastic elastomers are known. Block copolymer thermoplastic elastomers contain "hard" plastic segments which have a melting point or glass transition temperature above ambient as well as "soft" polymeric segments which have a glass transition or melt point considerably below room temperature. In these systems, the hard segments aggregate to form distinct microphases and act as physical crosslinks for the soft phase, thereby imparting a rubbery character at room temperature. At elevated temperatures, the hard segments melt or soften and allow the copolymer to flow and to be processed like an ordinary thermoplastic resin.

Alternatively, a thermoplastic elastomer referred to as a simple blend, or physical blend, can be obtained by uniformly mixing an elastomeric component with a thermoplastic resin. When the elastomeric component is also crosslinked during mixing, a thermoplastic elastomer known in the art as a thermoplastic vulcanizate (TPV) results. Since the crosslinked elastomeric phase of a TPV is insoluble and non-flowable at elevated temperature, TPVs generally exhibit improved oil and solvent resistance as well as reduced compression set relative to the simple blends.

Typically, a TPV is formed by a process known as dynamic vulcanization, wherein the elastomer and the thermoplastic matrix are mixed and the elastomer is cured with the aid of a crosslinking agent and/or catalyst during the mixing process. A number of such TPVs are known in the art, including some wherein the crosslinked elastomeric component can be a silicone polymer while the thermoplastic component is an organic, non-silicone polymer (i.e., a thermoplastic silicone vulcanizate or TPSiV). In such a material, the elastomeric component can be cured by various mechanisms including radical, condensation and hydrosilylation method, but each method has its limitations.

Arkles, in U.S. Pat. No. 4,500,688, discloses semi-interpenetrating networks (semi-IPNs) wherein a vinyl-containing silicone fluid having a viscosity of 500 to 100,000 cS is dispersed in a conventional thermoplastic resin. Arkles only illustrates these IPNs at relatively low levels of silicone. The vinyl-containing silicone is vulcanized in the thermoplastic during melt mixing according to a chain extension or crosslinking mechanism which employs a silicon hydride-containing silicone component. Typical thermoplastics mentioned include polyesters, polyurethanes, styrenics, polyacetals and polycarbonates. This disclosure is expanded by Arkles in U.S. Pat. No. 4,714,739 to include the use of hybrid silicones which contain unsaturated groups and are prepared by reacting a hydride-containing silicone with an organic polymer having unsaturated functionality. Although Arkles discloses a silicone fluid content ranging from 1 to 40 weight percent (1 to 60% in the case of the '739 patent), there is no suggestion of any criticality as to these proportions or to the specific nature of the organic resin.

Crosby et al., in U.S. Pat. No. 4,695,602, teach composites wherein a silicone semi-IPN vulcanized via a hydrosilation reaction is dispersed in a fiber-reinforced thermoplastic resin having a high flexural modulus. The silicones employed are of the type taught by Arkles, cited supra, and the composites are said to exhibit improved shrinkage and warpage characteristics relative to systems which omit the IPN.

Ward et al., in U.S. Pat. No. 4,831,071, disclose a method for improving the melt integrity and strength of a high modulus thermoplastic resin to provide smooth-surfaced, high tolerance profiles when the modified resin is melt-drawn. As in the case of the disclosures to Arkles et al., cited supra, a silicone mixture is cured via a hydrosilation reaction after being dispersed in the resin to form a semi-IPN, after which the resulting composition is extruded and melt-drawn.

U.S. Pat. No. 6,013,715 to Gornowicz et al. teaches the preparation of TPSiV elastomers wherein a silicone gum (or filled silicone gum) is dispersed in either a polyolefin or a poly(butylene terephthalate) resin and the gum is subsequently dynamically vulcanized therein via a hydrosilation cure system. The resulting elastomers exhibit an ultimate elongation at break of at least 25% and have significantly improved mechanical properties over the corresponding simple blends of resin and silicone gum in which the gum is not cured (i.e., physical blends).

U.S. Pat. No. 6,281,286 to Chorvath et.al. discloses that the impact resistance of polyester and polyamide resins can be greatly augmented by preparing a thermoplastic silicone vulcanizate therefrom wherein the elastomeric component is a silicone rubber base which comprises a silicone gum and a silica filler and the weight ratio of the base to the resin ranges from 10:90 to 35:65. Although the resulting thermoplastic materials have improved impact resistance, they do not exhibit sufficiently low modulus to be useful as elastomers.

Copending application Ser. No. 09/535,556, filed on Mar. 27, 2000, discloses the incorporation of a hindered phenol compound in a TPSiV based on specific nylons wherein the phenol compound imparts improved mechanical properties relative to an unmodified composition.

Copending U.S. patent applications Ser. No. 09/843,906 and Ser. No. 09/845,971 discloses methods for making TPSiV using peroxide cure techniques. Ser. No. 09/843,906 teaches polyolefin TPSiV's whereas Ser. No. 09/845,971 teaches polyamide and polyester based TPSiV's.

Copending U.S. patent application Ser. No. 09/616,625, filed on Jul. 26, 2000, discloses the incorporation of a compatibilizer selected from (i) a coupling agent, (ii) a functional diorganopolysiloxane or (iii) a copolymer comprising at least one diorganopolysiloxane block and at least one block selected from polyamide, polyether, polyurethane, polyurea, polycarbonate or polyacrylate, in a TPSiV elastomer based on specific nylons wherein that inclusion the selected compatibilizer in the formulation improves either tensile strength or elongation over a similar TPSiV elastomer which does not contain the compatibilizer.

Copending U.S. patent application Ser. No. 09/728,920, filed on Dec. 4, 2000, discloses thermoplastic elastomer compositions wherein a silicone gum and a stabilizer are dispersed in a polyester resin and the silicone gum is dynamically vulcanized in the resulting mixture.

While copending U.S. patent application Ser. No. 09/728, 920 represents advances in the technology of polyester based TPSiV elastomers, there is still a need for improvements in the processing of these formulations. In particular, there is a need to provide comparable or enhanced elastomeric properties with lower costs formulations, or alternatively formulations having greater latitude. For example, a TPSiV elastomer having reduced levels of expensive Pt catalysts, silicone crosslinker, or silicone base, yet comparable performance to previously reported polyester TPSiV's would of commercial interest. Furthermore, there is a need to provide polyester based TPSiV formulations having excellent tensile and elongation properties, yet having improved flex modulus properties. Such materials are desirable for fabricating blow-molded and extruded articles of manufacturing.

SUMMARY OF THE INVENTION

The present inventors have unexpectedly found the addition of a glycidyl ester compatibilizer enhances the formation of silicone containing thermoplastic elastomer vulcanizates by compatibilizing the polyester resin and silicone gum resulting in improved physical properties, or alternatively, provides comparable physical properties of previously reported polyester TPSiV's (as disclosed for example in U.S. patent application Ser. No. 09/728,920) but with lesser amounts of silicone crosslinker or platinum catalyst. Furthermore, the present inventors have found the addition of a glycidyl ester compatibilizer also enhances the flex modulus properties of the resulting TPSiV formulations.

The present invention provides for a method of preparing a thermoplastic elastomer comprising:

(I) mixing
  (A) a thermoplastic resin comprising more than 50 percent by volume of a polyester resin said thermoplastic resin having a softening point of 23° C. to 300° C.,
  (B) a silicone elastomer comprising
    (B') 100 parts by weight of a diorganopolysiloxane gum having a plasticity of at least 30 and having an average of at least 2 alkenyl groups in its molecule and, optionally,
    (B") up to 200 parts by weight of a reinforcing filler, the weight ratio of said silicone elastomer to said thermoplastic resin is from 35:65 to 85:15,
  (C) a glycidyl ester compatibilizer,
  (D) an organohydrido silicon compound which contains an average of at least 2 silicon-bonded hydrogen groups in its molecule and
  (E) a hydrosilation catalyst, components (D) and (E) being present in an amount sufficient to cure said diorganopolysiloxane (B'); and
(II) dynamically vulcanizing said diorganopolysiloxane (B'),
  wherein at least one property of the thermoplastic elastomer selected from tensile strength or elongation is at least 25% greater than the respective property for a corresponding simple blend wherein said diorganopolysiloxane is not cured and said thermoplastic elastomer has an elongation of at least 30%.

The present invention also encompasses the thermoplastic elastomer compositions prepared by the methods taught herein.

DETAILED DESCRIPTION OF THE INVENTION

The first step of the method of the present invention involves mixing:

(A) a thermoplastic resin comprising more than 50 percent by volume of a polyester resin said thermoplastic resin having a softening point of 23° C. to 300° C.,
(B) a silicone elastomer comprising
  (B') 100 parts by weight of a diorganopolysiloxane gum having a plasticity of at least 30 and having an average of at least 2 alkenyl groups in its molecule and, optionally,
  (B") up to 200 parts by weight of a reinforcing filler, the weight ratio of said silicone elastomer to said thermoplastic resin is from 35:65 to 85:15,
(C) a glycidyl ester compatibilizer,
(D) an organohydrido silicon compound which contains an average of at least 2 silicon-bonded hydrogen groups in its molecule and
(E) a hydrosilation catalyst, components (D) and (E) being present in an amount sufficient to cure said diorganopolysiloxane (B').

Component (A) of the present invention is (A') a saturated thermoplastic polyester resin, or a blend of at least one such polyester resin with (A") a non-polyester, saturated thermoplastic resin, wherein the polyester resin (A') comprises more than 50 percent of the blend volume. For the purposes of the invention, the polyester resin (A') and the optional thermoplastic resin (A") have a softening point of at least about 23° C. but no greater than about 300° C. Herein, the "softening point" corresponds to the respective melting point of the thermoplastic resin if this resin (or blend) is at least partially crystalline and corresponds to the glass transition temperature when the thermoplastic resin is completely amorphous. When the softening point is below about 23° C., the resin is not a thermoplastic. Rather, such a material would already have an elastomeric character and modification thereof according to the method of the present invention would not be productive. On the other hand, a polyester resin, or resin blend, having a softening point greater than about 300° C. cannot be formulated into thermoplastic elastomers by the instant method. Preferably, the softening point is between 50° C. and 300° C. and most preferably between 200° C. and 300° C. Further, as used herein, the term "saturated thermoplastic" indicates that the resin does not contain aliphatic unsaturation.

Specific examples of resins which can comprise the saturated thermoplastic polyester of component (A') include homopolymers such as poly(butylene terephthalate) (PBT), poly(ethylene terephthalate) (PET), poly(trimethylene terephthalate) (PTT), poly(ethylene naphthalate) (PEN), poly(butylene naphthalate) (PBN), and poly(cyclohexylenedimethylene terephthalate) (PCT), inter alia. Alternatively, the polyester (A') can be a random, graft or block copolymer having more than 50 mole percent of its repeat units derived from the condensation of an organic diacid and an organic diol. Such copolymers can comprise (a) recurring structural units, wherein each structural unit comprises a diol residue and a diacid residue and wherein from 50 to 100 mol percent of the structural units comprise a divalent alicyclic hydrocarbon group as the diol residue of the structural unit (e.g., PCT and glycol modified polycyclohexyl terephthalate (PCT-G)); (b) recurring structural units, wherein each structural unit comprises a diol residue and a diacid residue and from 0 to less than 50% of the structural units comprise a divalent alicyclic hydrocarbon radical as the diol residue of the structural unit (e.g., PET-G); and (c) recurring structural units, wherein each structural unit comprises a diol residue and a diacid residue and wherein from 10 to less than 90% of the structural units comprise a divalent alicyclic hydrocarbon radical as the 3diol residue of the structural unit and from 10 to 90% of the structural units comprise a 2,6-naphythalene dicarboxylate group as the diacid residue of the structural unit. When the polyester resin contains two or more blocks having independent thermal transition temperatures, the above mentioned softening point refers to the higher melt point or glass transition temperature.

Saturated thermoplastic polyester resins are well known in the art and further description thereof is considered unnecessary.

It is preferred that the polyester resin is dried prior to use, as generally recommended by the manufacturer. This is typically accomplished by passing a dry air or inert gas stream over as-received resin pellets or powder at elevated temperatures. The degree of drying consistent with optimal ultimate elastomer properties depends on the particular polyester and other components of the invention and is readily determined by a few simple experiments for the system under consideration.

Optional thermoplastic resin (A") is any saturated resin other than a polyester having a softening point of 23° C. to 300° C. The nature of this component is not critical provided it does not contain functional groups which would prevent the dynamic vulcanization of the silicone gum (B"). It may be illustrated by thermoplastic resins such as polycarbonates (PC), acrylonitrile-butadiene-styrene terpolymers (ABS), polyamides, polystyrene, poly(phenylene oxide) (PPO), polypropylene (PP), thermoplastic polyolefins (TPO), polyetherimide (PEI) and polyketones, inter alia.

Silicone elastomer (B) is a diorganopolysiloxane gum (B') or, optionally, a uniform blend of this gum with a reinforcing filler (B").

Diorganopolysiloxane (B') is a high consistency (gum) polymer or copolymer which contains at least 2 alkenyl groups having 2 to 20 carbon atoms in its molecule. The alkenyl group is specifically exemplified by vinyl, allyl, butenyl, pentenyl, hexenyl and decenyl. The position of the alkenyl functionality is not critical and it may be bonded at the molecular chain terminals, in non-terminal positions on the molecular chain or at both positions. It is preferred that the alkenyl group is vinyl or hexenyl and that this group is present at a level of 0.001 to 3 weight percent, preferably 0.01 to 1 weight percent, in the diorganopolysiloxane gum.

The remaining (i.e., non-alkenyl) silicon-bonded organic groups in component (B') are independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl. It will be understood, or course, that these groups are selected such that the diorganopolysiloxane gum (B') has a glass temperature (or melt point) which is below room temperature and the gum is therefore elastomeric. Methyl preferably makes up at least 50, more preferably at least 90, mole percent of the non-alkenyl silicon-bonded organic groups in component (B').

Thus, diorganopolysiloxane (B') can be a homopolymer or a copolymer containing such organic groups. Examples include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by linear and partially branched straight-chain, linear structures being preferred.

Specific illustrations of organopolysiloxane (B') include: trimethylsiloxy-endblocked dimethylsiloxane-methylhexenylsiloxane copolymers; dimethylhexenylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and similar copolymers wherein at least one end group is dimethylhydroxysiloxy. Preferred systems for low temperature applications include methylphenylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is about 93%.

Component (B') may also include combinations of two or more organopolysiloxanes. Most preferably, component (B') is a polydimethylsiloxane homopolymer which is terminated with a vinyl group at each end of its molecule or is such a homopolymer which also contains at least one vinyl group along its main chain.

For the purposes of the present invention, the molecular weight of the diorganopolysiloxane gum is sufficient to impart a Williams plasticity number of at least about 30 as determined by the American Society for Testing and Materials (ASTM) test method 926. The plasticity number, as used herein, is defined as the thickness in millimeters×100 of a cylindrical test specimen 2 cm$^3$ in volume and approximately 10 mm in height after the specimen has been subjected to a compressive load of 49 Newtons for three minutes at 25° C. When the plasticity of this component is less than about 30, as in the case of the low viscosity fluid siloxanes employed by Arkles, cited supra, the TPSiVs prepared by dynamic vulcanization according to the instant method exhibit poor uniformity such that at high silicone contents (e.g., 50 to 70 weight percent) there are regions of essentially only silicone and those of essentially only thermoplastic resin, and the compositions are weak and friable. These gums are considerably more viscous than the silicone fluids employed in the prior art. For example, silicones contemplated by Arkles, cited supra, have an upper viscosity limit of 100,000 cS (0.1 m$^2$/s) and, although the plasticity of fluids of such low viscosity are not readily measured by the ASTM D 926 procedure, it was determined that this corresponds to a plasticity of approximately 24. Although there is no absolute upper limit on the plasticity of component (B'), practical considerations of processability in conventional mixing equipment generally restrict this value. Preferably, the plasticity number should be about 100 to 200, most preferably about 120 to 185.

Methods for preparing high consistency unsaturated group-containing polydiorganosiloxanes are well known and they do not require a detailed discussion in this specification. For example, a typical method for preparing an alkenyl-functional polymer comprises the base-catalyzed equilibration of cyclic and/or linear diorganopolysiloxanes in the presence of similar alkenyl-functional species.

Optional component (B") is a finely divided filler which is known to reinforce diorganopolysiloxane (B') and is preferably selected from finely divided, heat stable minerals such as fumed and precipitated forms of silica, silica aerogels and titanium dioxide having a specific surface area of at least about 50 m$^2$/gram. The fumed form of silica is a preferred reinforcing filler based on its high surface area, which can be up to 450 m$^2$/gram and a fumed silica having a surface area of 50 to 400 m$^2$/g, most preferably 200 to 380 m$^2$/g, is highly preferred. Preferably, the fumed silica filler is treated to render its surface hydrophobic, as typically practiced in the silicone rubber art. This can be accomplished by reacting the silica with a liquid organosilicon compound which contains silanol groups or hydrolyzable precursors of silanol groups. Compounds that can be used as filler treating agents, also referred to as anti-creeping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes. It is preferred that the treating compound is an oligomeric hydroxy-terminated diorganopolysiloxane having an average degree of polymerization (DP) of 2 to about 100, more preferably about 2 to about 10, and it is used at a level of about 5 to 50 parts by weight for each 100 parts by weight of the silica filler. When component (B') is the preferred vinyl-functional or hexenyl-functional polydimethylsiloxane, this treating agent is preferably a hydroxy-terminated polydimethylsiloxane.

When reinforcing filler (B") is employed, it is added at a level of up to 200 parts by weight, preferably 5 to 150 and most preferably 20 to 100 parts by weight, for each 100 parts by weight of gum (B') to prepare silicone elastomer (B). Such a blend is commonly termed a "base" by those skilled in the silicone art. Blending is typically carried out at room temperature using a two-roll mill, internal mixer or other suitable device. Alternatively, a reinforcing filler-containing silicone elastomer can be formed in-situ during mixing, but prior to dynamic vulcanization of the gum, as further described infra. In the latter case, the temperature of mixing is kept below the melting point of the polyester resin until the reinforcing filler is well dispersed in the diorganopolysiloxane gum.

Component (C) is a glycidyl ester compatibilizer. For purposes of this invention, a glycidyl ester compatibilizer is defined as a polymer comprising repeating units derived from one or more glycidyl ester monomers. The glycidyl ester polymer can be a polymer, copolymer, or terepolymer. A glycidyl ester monomer means a glycidyl ester of an ethylenically unsaturated carboxylic acid such as, e.g., acrylic acid, methacrylic acid, itaconic acid, and includes, e.g., glycidyl acrylate, glycidyl methacrylate, glycidyl itaconate. Representative of suitable glycidyl ester polymers useful in the present invention are the glycidyl esters described in U.S. Pat. No. 5,981,661 as glycidyl ester impact modifiers, which is hereby incorporated by reference. Preferably, the glycidyl ester polymer comprises first repeating units derived from one or more glycidyl ester monomers and second repeating units derived from one or more alpha-olefin monomers, e.g., ethylene, propylene, 1-butene, 1-pentene. Preferably, the glycidyl ester monomer is glycidyl acrylate or glycidyl methacrylate.

Suitable glycidyl ester polymers may, optionally, contain a minor amount, i.e., up to about 50 wt %, of repeating units derived from one or more other monoethylenically unsaturated monomers that are copolymerizable with the glycidyl ester monomer. As used herein the terminology "monoethylenically unsaturated" means having a single site of ethylenic unsaturation per molecule. Suitable copolymerizable monoethylenically unsaturated monomers include, e.g., vinyl aromatic monomers such as, e.g., styrene and vinyl toluene, vinyl esters such as e.g., vinyl acetate and vinyl propionate, and ($C_1$–$C_{20}$) alkyl (meth)acrylates such as, e.g., butyl acrylate, methyl methacrylate, cyclohexyl methacrylate. As used herein, the term "($C_1$–$C_{20}$) alkyl" means a straight or branched alkyl group of from 1 to 20 carbon atoms per group, such as e.g., methyl, ethyl, decyl, eicosyl, cyclohexyl and the term "(meth)acrylate" refers collectively to acrylate compounds and methacrylate compounds.

Suitable glycidyl ester copolymers can be made by, e.g., conventional free radical initiated copolymerization.

More preferably, the glycidyl ester polymers useful as compatibilizers in the present invention are selected from olefin-glycidyl (meth)acrylate polymers, olefin-vinyl acetate-glycidyl (meth)acrylate polymers and olefin-glycidyl (meth)acrylate-alkyl (meth)acrylate polymers. Most preferably, the glycidyl ester polymer is selected from random ethylene/acrylic ester/glycidyl methacrylates copolymers or terepolymers, such as the Lotader GMA products marketed by Elf Atochem (Elf Atochem, North America, Inc., Philadelphia, Pa.) as Lotader (R) AX 8900 Resin, Lotader (R) AX 8930, and Lotader (R) AX 8840.

The amounts of glycidyl ester compatibilizer (C) that can be added to step (I) of the present invention preferably ranges from 0.1 to 25 weight percent of the total of all components, more preferably, 0.5 to 15%, and most preferably ranges from 1 to 12% of the total of all components added.

The organohydrido silicon compound (D) is a crosslinker for diorganopolysiloxane (B') of present composition and is an organopolysiloxane which contains at least 2 silicon-bonded hydrogen atoms in each molecule, but having at least about 0.1 weight percent hydrogen, preferably 0.2 to 2 and most preferably 0.5 to 1.7, percent hydrogen bonded to silicon. Those skilled in the art will, of course, appreciate that either component (B') or component (D), or both, must have a functionality greater than 2 if diorganopolysiloxane (B') is to be cured (i.e., the sum of these functionalities must be greater than 4 on average). The position of the silicon-bonded hydrogen in component (D) is not critical, and it may be bonded at the molecular chain terminals, in non-terminal positions along the molecular chain or at both positions. The silicon-bonded organic groups of component (D) are independently selected from any of the hydrocarbon or halogenated hydrocarbon groups described above in connection with diorganopolysiloxane (B'), including preferred embodiments thereof. The molecular structure of component (D) is also not critical and is exemplified by straight-chain, partially branched straight-chain, branched, cyclic and network structures, linear polymers or copolymers being preferred.

Component (D) is exemplified by the following: low molecular siloxanes, such as $PhSi(OSiMe_2H)_3$; trimethylsiloxy-endblocked methylhydridopolysiloxanes; trimethylsiloxy-endblocked dimethylsiloxane-methylhydridosiloxane copolymers; dimethylhydridosiloxy-endblocked dimethylpolysiloxanes;

dimethylhydrogensiloxy-endblocked methylhydrogenpolysiloxanes; dimethylhydridosiloxy-endblocked dimethylsiloxane-methylhydridosiloxane copolymers; cyclic methylhydrogenpolysiloxanes; cyclic dimethylsiloxane-methylhydridosiloxane copolymers; tetrakis(dimethylhydrogensiloxy)silane; silicone resins composed of $(CH_3)_2HSiO_{1/2}$, $(CH_3)_3SiO_{1/2}$, and $SiO_{4/2}$ units; and silicone resins composed of $(CH_3)_2HSiO_{1/2}$, $(CH_3)_3SiO_{1/2}$, $CH_3Si\ O_{3/2}$, $PhSiO_{3/2}$ and $SiO_{4/2}$ units, wherein Ph hereinafter denotes phenyl group.

Particularly preferred organohydrido silicon compounds are polymers or copolymers with R""HSiO units ended with either R""$_3SiO_{1/2}$ or HR""$_2SiO_{1/2}$, wherein R"" is independently selected from alkyl groups having 1 to 20 carbon atoms, phenyl or trifluoropropyl, preferably methyl. It is also preferred that the viscosity of component (D) is about 0.5 to 1,000 mPa-s at 25° C., preferably 2 to 500 mPa-s. Further, this component preferably has 0.5 to 1.7 weight percent hydrogen bonded to silicon. It is highly preferred that component (D) is selected from a polymer consisting essentially of methylhydridosiloxane units or a copolymer consisting essentially of dimethylsiloxane units and methylhydridosiloxane units, having 0.5 to 1.7 percent hydrogen bonded to silicon and having a viscosity of 2 to 500 mPa-s at 25° C. Such a highly preferred system has terminal groups selected from trimethylsiloxy or dimethylhdridosiloxy groups. These SiH-functional materials are well known in the art and many of them are commercially available.

Component (D) may also be a combination of two or more of the above described systems and is used at a level such that the molar ratio of SiH therein to Si-alkenyl in component (B') is greater than 1 and preferably below about 50, more preferably 3 to 30, most preferably 4 to 20.

Hydrosilation catalyst (E) accelerates the cure of diorganopolysiloxane (B') in the present composition. This hydrosilation catalyst is exemplified by platinum catalysts, such as platinum black, platinum supported on silica, platinum supported on carbon, chloroplatinic acid, alcohol solutions of chloroplatinic acid, platinum/olefin complexes, platinum/alkenylsiloxane complexes, platinumibeta-diketone complexes, platinum/phosphine complexes and the like; rhodium catalysts, such as rhodium chloride and rhodium chloride/di(n-butyl)sulfide complex and the like; and palladium catalysts, such as palladium on carbon, palladium chloride and the like. Component (E) is preferably a platinum-based catalyst such as chloroplatinic acid; platinum dichloride; platinum tetrachloride; a platinum complex catalyst produced by reacting chloroplatinic acid and divinyltetramethyldisiloxane which is diluted with dimethylvinylsiloxy endblocked polydimethylsiloxane, prepared according to U.S. Pat. No. 3,419,593 to Willing; and a neutralized complex, of platinous chloride and divinyltetramethyldisiloxane, prepared according to U.S. Pat. No. 5,175,325 to Brown et al. Most preferably, catalyst (E) is a neutralized complex of platinous chloride and divinyltetramethyldisiloxane.

Component (E) is added to the present composition in a catalytic quantity sufficient to promote the reaction of components (B') and (D) and thereby cure the diorganopolysiloxane to form an elastomer. The catalyst is typically added so as to provide about 0.1 to 500 parts per million (ppm) of metal atoms based on the total weight of the thermoplastic elastomer composition, preferably 0.25 to 100 ppm.

A stablilizer, component (F), can optionally be added to the compositions of the present invention. Stabilizer (F) is at least one organic compound selected from hindered phenols; thioesters; hindered amines; 2,2'-(1,4-phenylene)bis(4H-3, 1-benzoxazin-4-one); or 3,5-di-tert-butyl-4-hydroxybenzoic acid, hexadecyl ester.

For the purposes of the present invention, a hindered phenol is an organic compound having at least one group of the formula

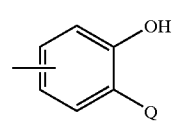

(i)

in its molecule, wherein Q is a monovalent organic group having 1 to 24 carbon atoms selected from hydrocarbon groups, hydrocarbon groups which optionally contain heteroatoms selected from sulfur, nitrogen or oxygen or halogen-substituted versions of the aforementioned groups. Examples of Q include groups such as alkyl, aryl, alkylaryl, arylalkyl, cycloalkyl and halogen-substituted version thereof; alkoxy groups having 1 to 24 carbon atoms, such as methoxy or t-butoxy; and hydrocarbon groups having 2 to 24 carbon atoms which contain heteroatoms (e.g., —$CH_2$—S—R", —$CH_2$—O—R" or —$CH_2$—C(O)OR", wherein R" is a hydrocarbon group having 1 to 18 carbon atoms). Further, although not explicitly shown in formula (i), it is also contemplated that the benzene ring may additionally be substituted with one or more of the above described Q groups. The residue of the organic compound to which group (i) is chemically bonded is not critical as long as it does not contain moieties which would interfere with the dynamic vulcanization, described infra. For example, this residue may be a hydrocarbon, a substituted hydrocarbon or a hetero atom-containing hydrocarbon group of the appropriate valence. It is also contemplated that the group according to formula (i) can be attached to hydrogen to form an organophenol. Preferably, the hindered phenol compound has a number average molecular weight of less than about 3,000.

A preferred hindered phenol compound contains at least one group of the formula

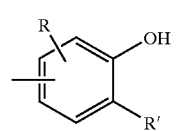

(ii)

in its molecule wherein the benzene ring may be optionally further substituted with hydrocarbon groups having 1 to 24 carbon atoms. In formula (ii), R is an alkyl group having one to four carbon atoms and R' is a hydrocarbon group having 4 to 8 carbon atoms.

Preferably, one to four of the groups shown in structures (i) or (ii) are attached to an organic residue of appropriate valence such that the contemplated compound has a molecular weight (MW) of less than about 1,500. Most preferably, four such groups are present in component (F) and this compound has a molecular weight of less than about 1,200. This monovalent (or polyvalent) organic residue can contain one or more heteroatoms such as oxygen, nitrogen, phosphorous and sulfur. The R' groups in the above formula may be illustrated by t-butyl, n-pentyl, butenyl, hexenyl, cyclopentyl, cyclohexyl and phenyl. It is preferred that both R and R' are t-butyl. For the purposes of the present invention, a group according to formula (ii) can also be attached to hydrogen to form a diorganophenol.

Non-limiting specific examples of suitable hindered phenols include 1,1,3-Tris(2'-methyl-4'-hydroxy-5'-t-butylphenyl)butane, N,N'-hexamethylene bis(3-(3,5-di-t-butyl-4-hydroxyphenyl)propionamide), 4,4'-thiobis(2-t-butyl-5-methylphenol), 1,3,5-tris(4-tert-butyl-3-hydroxy-2,6-dimethyl benzyl)-1,3,5-triazine-2,4,6-(1H,3H,5H)-trione, N,N'-hexamethylenebis(3,5-di-tert-butyl-4-hydroxyhydrocinnamamide), tetrakis(methylene(3,5-di-tert-butyl-4-hydroxy-hydrocinnamate))methane, 1,3,5-trimethyl-2,4,6-tris (3,5-di-tert-butyl-4-hydroxybenzyl) benzene, 4,4'-methylenebis (2,6-di-tertiary-butylphenol), 2,2'-thiobis(6-tert-butyl-4-methylphenol), 2,2'-thiobis(4-octylphenol), 4,4'-thiobis(6-tert-butyl-2-methylphenol), 4,4'-thiobis(3,6-di-sec-amylphenol), 2-(4,6-bis(2,4-dimethylphenyl)-1,3,5,-triazin-2-yl)-5-(octyloxy) phenol, 2,4-bisoctylmercapto-6-(3,5-di-tert-butyl-4-hydroxyanilino)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate, 1,3,5-tris(4-tert-butyl-3-hydroxy-2,6-dimethylbenzyl) isocyanurate, 2,6-di-tert-butyl-4-methoxyphenol, 2,5-di-tert-butylhydroquinone, 2,5-di-tert-amylhydroquinone, 2,6-di-tert-butylhydroquinone, 2,5-di-tert-butyl-4-hydroxyanisole, 2,6-diphenyl-4-octadecyloxyphenol, 3,5-di-tert-butyl-4-hydroxyanisole, 3,5-di-tert-butyl-4-hydroxyphenyl stearate, bis(3,5-di-tert-butyl-4-hydroxyphenyl) adipate, esters of beta-(3,5-di-tert-butyl-4-hydroxyphenyl)propionic acid with mono- or polyhydric alcohols (e.g., methanol, ethanol, n-octanol, trimethyihexanediol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, trimethylolpropane, tris(hydroxyethyl) isocyanurate, N,N'-bis(hydroxyethyl)oxalamide, 3-thiaundecanol, 3-thiapentadecanol, 4-hydroxymethyl-1-phospha-2,6,7-trioxabicyclo(2.2.2) octane and esters of beta-(5-tert-butyl-4-hydroxy-3-methylphenyl)propionic acid with mono- or polyhydric alcohols (as above).

Thioesters of the invention are compounds having at least one group of the formula G—S—G (iii)

wherein G is —CH$_2$—CH$_2$—C(O)OR''' and R''' is a monovalent hydrocarbon group having 1 to 24 carbon atoms. Specific non-limiting examples of suitable thioesters include distearyl 3,3'-thiodipropionate, dilauryl-3,3'-thiodipropionate and di(tridecyl)3,3'-thiodipropionate.

The hindered amine of the present invention is a low molecular weight organic compound or a polymer which contains at least one divalent group of the formula

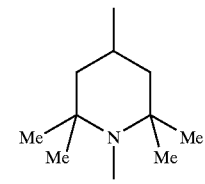

wherein Me hereinafter denotes a methyl group. The backbone of this component is not critical as long as it does not contain functionality which would interfere with the dynamic vulcanization of the silicone gum and it may be illustrated by low-molecular and polymeric polyalkylpiperidines, as disclosed in U.S. Pat. No. 4,692,486, hereby incorporated by reference. Preferably, the above group has the structure

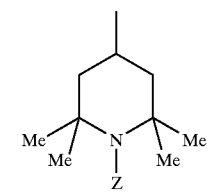

wherein Z is selected from hydrogen or an alkyl group having 1 to 24 carbon atoms, preferably hydrogen.

Specific non-limiting examples of suitable hindered amines include: 1,6-hexanediamine, N,N'-bis(2,2,6,6-pentamethyl-4-piperidinyl)-, polymers with morpholine-2,4,6-trichloro-1,3,5-triazine; 1,6-hexanediamine, N,N'-bis(2,2,6,6-tetramethyl-4-piperidinyl)-, polymers with 2,4,-Dichloro-6-(4-morpholinyl)-1,3,5-triazine; bis(1,2,2,6,6-pentamethyl-4-piperidinyl) sebacate; bis(2,2,6,6-tetramethyl-4-piperidinyl) sebacate; dimethyl succinate polymer with 4-hydroxy-2,2,6,6-tetramethyl-1-piperidine ethanol; and polymethyl (propyl-3-oxy-(2',2',6',6'-tetramethyl-4'-piperidinyl) siloxane.

Preferred stabilizers of the invention are tetrakis (methylene(3,5-di-tert-butyl-4-hydroxy-hydrocinnamate)) methane, N,N'-hexamethylenebis(3,5-di-tert-butyl-4-hydroxyhydrocinnamamide), and Benzenamine, N-phenyl-, reaction products with 2,4,4-trimethylpentene (for example Irganox 5057 from Ciba Specialty Chemicals).

From about 0.01 to about 5 parts by weight of stabilizer (F) are employed for each 100 parts by weight of resin (A) plus silicone elastomer (B). Preferably, 0.1 to 2 parts by weight, more preferably 0.1 to 1 part by weight, of (F) are added for each 100 parts by weight of (A) plus (B).

A catalyst inhibitor, component (G), can also be incorporated into the compositions of the present invention. The catalyst inhibitor can be any material that is known to be, or can be, used to inhibit the catalytic activity of platinum group metal-containing catalysts. By the term "inhibitor" it is meant herein a material that retards the room temperature curing of a mixture of Components (B), (D), and (E), and any optional components without preventing the elevated curing of the mixture. Examples of suitable inhibitors include ethylenically unsaturated amides, aromatically unsaturated amides, acetylenic compounds, silylated acetylenic compounds, ethylenically unsaturated isocyanates, olefinic siloxanes, unsaturated hydrocarbon diesters, conjugated ene-ynes, hydroperoxides, nitriles, and diaziridines.

Preferred inhibitors are exemplified by acetylenic alcohols exemplified by 1-ethynyl-1-cyclohexanol, 2-methyl-3- butyn-2-ol, 2-phenyl-3-butyn-2-ol, 2-ethynyl-isopropanol, 2-ethynyl-butane-2-ol, and 3,5-dimethyl-1-hexyn-3-ol, silylated acetylenic alcohols exemplified by trimethyl(3,5-dimethyl-1-hexyn-3-oxy)silane, dimethyl-bis-(3-methyl-1-butyn-oxy)silane, methylvinylbis(3-methyl-1-butyn-3-oxy)silane, and ((1,1-dimethyl-2-propynyl)oxy)trimethylsilane, unsaturated carboxylic esters exemplified by diallyl maleate, dimethyl maleate, diethyl fumarate, diallyl fumarate, and bis-(methoxyisopropyl) maleate, conjugated ene-ynes exemplified by 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, and 3-phenyl-3-butene-1-yne, vinylcyclosiloxanes such as 1,3,5,7-tetramethyl-1,3,5,7-tetravinylcyclotetrasiloxane, and a mixture of a conjugated ene-yne as described above and a vinylcyclosiloxane as described above. A particularly preferred catalyst inhibitor is methyl (tris(methylbutoxy))silane, marketed as RSM-063 by Dow Corning Toray Silicones (Chiba, Japan).

The amount of inhibitor to be used in the thermoplastic elastomer compositions of this invention is not critical. It is preferred that from 0.01 to 10 parts by weight of inhibitor be used per 100 parts by weight of components (A)+(B).

In addition to the above-mentioned components (A) through (G), a minor amount (i.e., less than about 40 weight percent of the total composition, preferably less than 20 weight percent) of an optional additive (H) can be incorporated in the compositions of the present invention. This optional additive can be illustrated by, but are not limited to, fillers, such as glass fibers and carbon fibers, quartz, talc, calcium carbonate, diatomaceous earth, iron oxide, carbon black and finely divided metals; lubricants; plasticizers; pigments; dyes; anti-static agents; blowing agents; heat stabilizers, such as hydrated cerric oxide; antioxidants; and fire retardant (FR) additives, such as halogenated hydrocarbons, alumina trihydrate, magnesium hydroxide and organophosphorous compounds. A preferred FR additive is calcium silicate particulate, preferably wollastonite having an average particle size of 2 to 30 $\mu$m. The FR additive can be incorporated in the silicone gum (B') or in resin (A), or in both, Optional additives (H) are typically added to the final thermoplastic composition after dynamic cure, but they may also be added at any point in the preparation provided they do not adversely affect dynamic vulcanization. Of course, the above additional ingredients are only used at levels which do not significantly detract from the desired properties of the final composition.

For the purposes of the present invention, the weight ratio of silicone elastomer (B) to resin (A) is greater than 35:65. It has been found that when this ratio is 35:65 or less, the resulting vulcanizate has a modulus more resembling that of thermoplastic resin (A) than that of a thermoplastic elastomer. On the other hand, the above mentioned ratio should be no more than 85:15 since the compositions tend to be weak and resemble cured silicone elastomers above this value. Notwithstanding this upper limit, the maximum weight ratio of (B) to (A) for any given combination of components is also limited by processability considerations since too high a silicone elastomer content results in at least a partially crosslinked continuous phase which is no longer thermoplastic. For the purposes of the present invention, this practical limit is readily determined by routine experimentation and represents the highest level of component (B) which allows the TPSiV to be compression molded. It is, however, preferred that the final thermoplastic elastomer can also be readily processed in other conventional plastic operations, such as injection molding and extrusion and, in this case, the weight ratio of components (B) to (A) should be no more than about 75:25. Such a preferred thermoplastic elastomer which is subsequently re-processed generally has a tensile strength and elongation similar to the corresponding values for the original TPSiV (i.e., the thermoplastic elastomer is little changed by this re-processing). Although the amount of silicone elastomer consistent with the above mentioned requirements depends upon the particular polyester resin and other components selected, it is preferred that the weight ratio of components (B) to (A) is 40:60 to 75:25, more preferably 40:60 to 70:30.

The second step in the method of the present invention is dynamically vulcanizing the diorganopolysiloxane (B'). As used herein, "dynamically vulcanizing" means the diorganopolysiloxanes (B') undergoes a curing process, i.e, is cured.

Thus, the thermoplastic elastomers of the present invention can be prepared by thoroughly mixing silicone elastomer (B) and compatibilizer (C) with resin (A) and then dynamically vulcanizing the diorganopolysiloxane using organohydrido silicon compound (D) and catalyst (E). Optional stabilizer (F) can be added at any point, but preferably is added following through mixing of the compatibilizer (C) with components (A), (B) and (D), but before the addition of component (E).

Mixing is carried out in any device which is capable of uniformly dispersing the components in the polyester resin or resin blend, such as an internal mixer or an extruder, the latter being preferred for commercial preparations, wherein the temperature is preferably kept as low as practical consistent with good mixing so as not to degrade the resin. Depending upon the particular system, order of mixing is generally not critical and, for example, components (A), (C) and (D) can be added to (B) at a temperature above the softening point of (A), catalyst (E) then being introduced to initiate dynamic vulcanization. However, components (B) through (D) should be well dispersed in resin (A) before dynamic vulcanization begins.

An alternative embodiment for mixing involves creating a premix of components (B), (D), (E), (F), and (G). This premix is then added component (A) and component (C) with subsequent heating which initiates the vulcanization process. The present inventors have found this mode of mixing requires less crosslinker and catalyst, which offers potential economical processing.

As previously mentioned, it is also contemplated that a reinforcing filler-containing silicone elastomer can be formed in-situ. For example, the optional reinforcing filler may be added to a mixer already containing resin (A) and diorganopolysiloxane gum (B') at a temperature below the softening point of the resin to thoroughly disperse the filler in the gum. The temperature is then raised to melt the resin, the other ingredients are added and mixing/dynamic vulcanization are carried out. Optimum temperatures, mixing times and other conditions of the mixing operation depend upon the particular resin and other components under consideration and these may be determined by routine experimentation by those skilled in the art. It is, however, preferred to carry out the mixing and dynamic vulcanization under a dry, inert atmosphere (i.e., one that does not adversely react with the components or otherwise hinder hydrosilation cure), such as dry nitrogen, helium or argon.

A preferred procedure according to the instant method comprises forming a pre-mix by blending dried polyester resin (A), silicone elastomer (B), compatibizer (C) and, optionally, organohydrido silicon compound (D) below the softening point of the resin (e.g., at ambient conditions).

This pre-mix is then melted in a bowl mixer or internal mixer, preferably using a dry inert gas purge, at a controlled temperature which is just above the softening of the resin to about 35° C. above this value and catalyst (E) is mixed therewith. Mixing is continued until the melt viscosity (mixing torque) reaches a steady state value, thereby indicating that dynamic vulcanization of the diorganopolysiloxane of component (B) is complete. Such a "cold-blend" procedure is particularly preferred when the melt point of the polyester resin is above about 280° C., as in the case of, e.g., PCT resin.

As noted above, in order to be within the scope of the present invention, the tensile strength or elongation, or both, of the TPSiVs must be at least 25% greater than that of a corresponding simple blend. A further requirement of the invention is that the TPSiV has at least 30% elongation, as determined by the test described infra. In this context, the term "simple blend" or "physical blend" denotes a composition wherein the weight proportions of resin (A), elastomer (B) and compatibilizer (C) are identical to the proportions in the TPSiV, but no cure agents are employed (i.e., either component (D) or (E), or both, are omitted and the gum is therefore not cured). In order to determine if a particular composition meets the above criterion, the tensile strength of the TPSiV is measured on dumbbells having a length of 25.4 mm and a width of 3.0 mm and a typical thickness of 1 to 2 mm, according to ASTM method D 412, Die D, at an extension rate of 50 mm/min. Five samples are evaluated and the results averaged after removing obvious low readings due to sample inhomogeneity (e.g., such as voids, contamination or inclusions). These values are then compared to the corresponding average tensile and elongation values of a sample prepared from the simple blend composition. When at least a 25% improvement in tensile and/or elongation over the simple blend is not realized there is no benefit derived from the dynamic vulcanization and such compositions are not within the scope of the present invention.

The thermoplastic elastomer prepared by the above-described method can then be processed by conventional techniques, such as extrusion, vacuum forming, injection molding, blow molding or compression molding. Moreover, these compositions can be re-processed (recycled) with little or no degradation of mechanical properties.

The novel thermoplastic elastomers of the present invention can be used for fabricating parts and components for automotive, electronics, electrical, communications, appliance and medical applications, inter alia. For example, they may be used to produce wire and cable insulation; automotive and appliance components, such as belts, hoses, boots, bellows, gaskets, fuel line components and air ducts; architectural seals; bottle closures; furniture components; soft-feel grips for hand held devices (e.g. handles for tools); medical devices; sporting goods and general rubber parts.

EXAMPLES

The following examples are presented to further illustrate the compositions and method of this invention, but are not to be construed as limiting the invention, which is delineated in the appended claims. All parts and percentages in the examples are on a weight basis and all measurements were obtained at about 23° C., unless indicated to the contrary.
Materials The following materials, listed alphabetically for ease of reference, were employed in the examples.
BASE 1 is a silicone rubber base made from 68.78% PDMS 1, defined infra, 25.8% of a fumed silica having a surface area of about 250 m$^2$/g (Cab-O-Sil® MS-75 by Cabot Corp., Tuscola, Ill.), 5.4% of a hydroxy-terminated diorganopolysiloxane having an average degree of polymerization (DP) of about 8 and 0.02% of ammonia.

CATALYST 1 is a solution of one part of (i) a catalyst composition consisting essentially of 1.5% of a platinum complex of 1,3-diethenyl-1,1,3,3-tetramethyldisiloxane, 6.0% tetramethyldivinyldisiloxane, 92% of a dimethylvinyl ended polydimethylsiloxane and 0.5% of a dimethylcyclopolysiloxanes having 6 or greater dimethylsiloxane units diluted in nine parts of (ii) a trimethylsiloxy-terminated polydimethylsiloxane oil having a viscosity of 1,000 cSt (1,000 m$^2$/s).

CATALYST 2 is a solution of one part of (i) a catalyst composition consisting essentially of 1.5% of a platinum complex of 1,3-diethenyl-1,1,3,3-tetramethyldisiloxane, 6.0% tetramethyldivinyldisiloxane, 92% of a dimethylvinyl ended polydimethylsiloxane and 0.5% of a dimethylcyclopolysiloxanes having 6 or greater dimethylsiloxane units diluted in 3999 parts of (ii) a trimethylsiloxy-terminated polydimethylsiloxane oil having a viscosity of 1,000 cSt (1,000 m$^2$/s).

COMPATIBILIZER 1 is an ethylene-methyl acrylate-glycidyl methacrylate terpolymer (E-MA-GMA) marketed under the trade name AX 8900 from Elf Atochem North America, Inc., 2000 Market Street, Philadelphia, Pa. 19103.

COMPATIBILIZER 2 is an ethylene-methyl acrylate-glycidyl methacrylate terpolymer (E-MA-GMA) marketed under the trade name AX 8930 from Elf Atochem North America, Inc., 2000 Market Street, Philadelphia, Pa. 19103. America, Inc., 2000 Market Street, Philadelphia, Pa. 19103.

IRGANOX™ 1010 is a hindered phenol stabilizer marketed by Ciba Specialty Chemicals Corporation and described as tetrakis(methylene(3,5-di-tert-butyl-4-hydroxyhydrocinnamate))methane.

IRGANOX™ 5057 is a hindered amine stabilizer marketed by Ciba Specialty Chemicals Corporation and described as Benzenamine, N-phenyl-,reaction products with 2,4,4-trimethylpentene.

PBT 1 is a poly(butylene terephthalate) marketed by Dupont as Crastin 6131

PBT 2 is a poly(butylene terephthalate) marketed by General Electric as Valox 315.

PDMS 1 is a gum consisting of 99.81 wt % Me$_2$SiO units, 0.16% MeViSiO units and 0.03% Me$_2$ViSiO$_{1/2}$ units. Prepared by potassium catalyzed equilibration of cyclic siloxanes wherein the catalyst is neutralized with carbon dioxide. This gum has plasticity of about 150.

X-LINKER 1 is an SiH-functional crosslinker consisting essentially of 68.4% MeHSiO units, 28.1% Me$_2$SiO units and 3.5% Me$_3$SiO$_{1/2}$ units and has a viscosity of approximately 29 mPa·s. This corresponds to the average formula MD$_{16}$D'$_{39}$M, in which M is (CH$_3$)$_3$Si—O—, D is —Si(CH$_3$)$_2$—O— and D' is —Si(H)(CH$_3$)—O—.

RMS-063 is an inhibitor, marketed by Dow Corning Toray Silicones (Chiba, Japan), as methyl (tris(methylbutoxy)) silane.

In the following three examples, mixing of components was started using an internal mixer at a temperature of 240° C. in order to avoid degradation thereof as the actual temperature increased due to heat generated by the mixing process. In each case, the actual temperature of the mixed composition upon completion of vulcanization was above the resin melt point. Test specimens were prepared by compression molding a 4 in×4 in×0.062 inch plaque using a hot press and Teflon coated plates at a temperature of 250° C. Test specimens were die cut from plaques and tested according to ASTM D412 using Die D.

Example 1

| Formulations | Comparative Example | Run 1 |
|---|---|---|
| Base 1 (%) | 59.14 | 58.68 |
| Irg. 1010 (%) | 0.07 | 0.07 |
| PBT 2 (%) | 39.43 | 39.12 |
| Compatibilizer 1 (%) | 0.0 | 0.78 |
| X-Linker 1 (%) | 0.27 | 0.27 |
| Catalyst 1 (%) | 1.09 | 1.08 |
| Tensile strength (Mpa) | 5.75 | 7.79 |
| Elongation (%) | 34 | 102 |

Example 2

In this example, the Irganox 1010, Base 1, and X-Linker 1 were pre-blended in a internal mixer at a temperature of 30° C. and a speed of 60 rpms. This pre-blend was removed from the mixer and the mixer was heated to 240° C. The speed of the mixer was set to 60 rpms and the PBT 1, pre-blend, Compatibilizer 1 (if used), and catalyst were added.

| Formulations | Comparative Example | Run 2 |
|---|---|---|
| Irg. 101 (%) (in base) | 0.30 | 0.30 |
| Base 1 (%) | 57.50 | 57.50 |
| PBT 1 (%) | 40.00 | 33.00 |
| Compatibilizer 1 (%) | 0.00 | 7.00 |
| X-Linker 1 (%) (in base) | 1.60 | 1.60 |
| Catalyst 1 (%) | 0.50 | 0.50 |
| Tensile strength (MPa) | 11.64 | 15.59 |
| Elongation (%) | 169 | 246 |

Example 3

In this example; Base 1, X-Linker 1, RMS-063, and Catalyst 2 were pre-blended in an internal mixer at a temperature of 30° C. and 60 rpms. This pre-blend was then removed from the mixer and the mixer was heated to 240° C. Once at 240° C.; PBT 1, Compatibilizer (if used), and the pre-blend were added to the mixer at 60 rpms.

| Formulations | Comparative Example | Run 3 |
|---|---|---|
| Base 1 (%) | 59.35 | 57.02 |
| PBT 1 (%) | 40.00 | 38.47 |
| Compatibilizer 1 (%) | 0.00 | 3.85 |
| RMS063 (%) | 0.06 | 0.03 |
| X-Linker 1 (%) | 0.35 | 0.40 |
| Catalyst 2 | 0.24 | 0.23 |
| Tensile strength (Mpa) | 5.75 | 13.62 |
| Elongation (%) | 34 | 178 |

All above examples were tested according to ASTM D412 using the jaw travel distance to determine elongation.

Example 4

The following examples were prepared using a 25 mm Werner and Pfleiderer Twin Screw extruder with the processing section heated to 240° C. and a screw speed of 250 rpms at a rate of 10 kg/hr. Test specimens were prepared by injection molding 4.00 inch×4.00 inch×0.062 inch plaques at 250° C. with a mold temperature of 60° C. Die D test bars were die cut from the plaques and tested according to ASTM D412 using a laser extensometer to measure elongation.

|  | Run 4 | Run 5 | Run 6 |
|---|---|---|---|
| PBT 1 (%) | 39.24 | 39.24 | 49.05 |
| Compatibilizer 1 (%) | 0.00 | 9.83 | 0.00 |
| Compatibilizer 2 (%) | 9.83 | 0.00 | 0.00 |
| Base 1 (%) | 49.04 | 49.04 | 49.05 |
| X-linker 1 (%) | 0.94 | 0.94 | 0.94 |
| Irganox 5057 (%) | 0.44 | 0.44 | 0.44 |
| Catalyst 1 (%) | 0.51 | 0.51 | 0.51 |
| Total | 100.00% | 100.00% | 100.00% |
| Tensile Strength (Mpa) | 15.1 | 15.2 | 18.2 |
| Tensile Elongation (%) | 244 | 240 | 201 |
| Tensile Modulus (100%) | 11.4 | 11.5 | 15.3 |

That which is claimed is:

1. A method for preparing a thermoplastic elastomer comprising:
   (I) mixing
      (A) a thermoplastic resin comprising more than 50 percent by volume of a polyester resin said thermoplastic resin having a softening point of 23° C. to 300° C.,
      (B) a silicone elastomer comprising
         (B') 100 parts by weight of a diorganopolysiloxane gum having a plasticity of at least 30 and having an average of at least 2 alkenyl groups in its molecule and, optionally,
         (B") up to 200 parts by weight of a reinforcing filler, the weight ratio of said silicone elastomer to said thermoplastic resin is from 35:65 to 85:15,
      (C) a glycidyl ester compatibilizer,
      (D) an organohydrido silicon compound which contains an average of at least 2 silicon-bonded hydrogen groups in its molecule and
      (E) a hydrosilation catalyst, components (D) and (E) being present in an amount sufficient to cure said diorganopolysiloxane (B'); and
   (II) dynamically vulcanizing said diorganopolysiloxane (B'), wherein at least one property of the thermoplastic elastomer selected from tensile strength or elongation is at least 25% greater than the respective property for a corresponding simple blend wherein said diorganopolysiloxane is not cured and said thermoplastic elastomer has an elongation of at least 30%.

2. The method according to claim 1, wherein said polyester resin is selected from poly(butylene terephthalate), poly(ethylene terephthalate), poly(trimethylene terephthalate), poly(ethylene naphthalate), poly(butylene naphthalate) or poly(cyclohexylenedimethylene terephthalate).

3. The method according to claim 1, wherein said diorganopolysiloxane (B') is a gum selected from a copolymer consisting essentially of dimethylsiloxane units and methylvinylsiloxane units or a copolymer consisting essentially of dimethylsiloxane units and methylhexenylsiloxane units, and said reinforcing filler (B") is a fumed silica.

4. The method according to claim 1, wherein the glycidyl ester compatibilizer is a glycidyl ester polymer comprising repeating units of one or more glycidyl ester monomers.

5. The method according to claim 4, wherein the glycidyl ester polymer comprises first repeating units derived from one or more glycidyl ester monomers and second repeating units derived from one or more alpha-olefin monomers.

6. The method according to claim 5, wherein the glycidyl ester monomer is glycidyl acrylate or glycidyl methacrylates.

7. The method according to claim 4, wherein the glycidyl ester polymer is selected from olefin-glycidyl (meth)acrylate polymers, olefin-vinyl acetate-glycidyl (meth)acrylate polymers and olefin-glycidyl (meth)acrylate-alkyl (meth) acrylate polymers.

8. The method according to claim 4, wherein the glycidyl ester polymer is a random ethylene/acrylic ester/glycidyl methacrylates copolymer or terpolymer.

9. The method according to claim 1, wherein said organohydrido silicon component (D) is selected from the group consisting of a polymer consisting essentially of methylhydridosiloxane units and a copolymer consisting essentially of dimethylsiloxane units and methylhydridosiloxane units, having 0.5 to 1.7 weight percent hydrogen bonded to silicon and having a viscosity of 2 to 500 mPa·s at 25° C. and said catalyst (E) is a neutralized complex of platinous chloride and divinyltetramethyldisiloxane.

10. The method according to claim 1, wherein the weight ratio of said silicone elastomer (B) to said resin (A) is 40:60 to 70:30.

11. The method according to claim 1, wherein (F), a stabilizer is added.

12. The method according to claim 11 wherein the stabilizer is selected from hindered phenols; thioesters; hindered amines; 2,2'-(1,4-phenylene)bis(4H-3, 1-benzoxazin-4-one); or 3,5-di-tert-butyl-4-hydroxybenzoic acid, hexadecyl ester.

13. The method according to claim 1, wherein (G), a catalyst inhibitor is added.

14. The method according to claim 13 wherein the catalyst inhibitor is selected from ethylenically unsaturated amides, aromatically unsaturated amides, acetylenic compounds, silylated acetylenic compounds, ethylenically unsaturated isocyanates, olefinic siloxanes, unsaturated hydrocarbon diesters, conjugated ene-ynes, hydroperoxides, nitrites, and diaziridines.

15. The method according to claim 13 wherein the catalyst inhibitor is methyl (tris(methylbutoxy))silane.

16. A thermoplastic elastomer prepared by the method of claim 1.

17. A thermoplastic elastomer prepared by the method of claim 2.

18. A thermoplastic elastomer prepared by the method of claim 3.

19. A thermoplastic elastomer prepared by the method of claim 4.

20. A thermoplastic elastomer prepared by the method of claim 5.

21. A thermoplastic elastomer prepared by the method of claim 6.

22. A thermoplastic elastomer prepared by the method of claim 7.

23. A thermoplastic elastomer prepared by the method of claim 8.

24. A thermoplastic elastomer prepared by the method of claim 9.

25. A thermoplastic elastomer prepared by the method of claim 10.

26. A thermoplastic elastomer prepared by the method of claim 11.

27. A thermoplastic elastomer prepared by the method of claim 12.

28. A thermoplastic elastomer prepared by the method of claim 13.

* * * * *